(12) United States Patent
Yao et al.

(10) Patent No.: US 10,666,154 B2
(45) Date of Patent: May 26, 2020

(54) DC TO DC CONVERTER

(71) Applicant: ABB Schweiz AG, Baden (CH)

(72) Inventors: Dawei Yao, Beijing (CN); Xiaobo Yang, Beijing (CN); Guoxing Fan, Beijing (CN); Sheng Zong, Beijing (CN)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 16/428,114

(22) Filed: May 31, 2019

(65) Prior Publication Data

US 2020/0076317 A1 Mar. 5, 2020

Related U.S. Application Data (63) Continuation of application No. PCT/CN2017/079277, filed on Apr. 1, 2017.

(51) Int. Cl.
*H02M 3/335* (2006.01)

(52) U.S. Cl.
CPC .............. *H02M 3/33584* (2013.01)

(58) Field of Classification Search
CPC ............ H02M 3/22; H02M 3/24; H02M 3/28; H02M 3/315; H02M 3/3155; H02M 3/325; H02M 7/219
See application file for complete search history.

(56) References Cited

U.S. PATENT DOCUMENTS

| | | | | |
|---|---|---|---|---|
| 2003/0133317 A1* | 7/2003 | Norrga | ............... | H02M 5/297 363/127 |
| 2009/0290384 A1* | 11/2009 | Jungreis | ............ | H02M 1/4241 363/17 |

(Continued)

FOREIGN PATENT DOCUMENTS

| | | |
|---|---|---|
| CN | 103997221 A | 8/2014 |
| CN | 104811047 A | 7/2015 |
| CN | 106452084 A | 2/2017 |

OTHER PUBLICATIONS

Intellectual Property Office of the P.R. China, International Search Report & Written Opinion issued in corresponding Application No. PCT/CN2017/079277, dated Jan. 3. 2018, 10 pp.

(Continued)

*Primary Examiner* — Alex Torres-Rivera
(74) *Attorney, Agent, or Firm* — Taft Stettinius & Hollister LLP; J. Bruce Schelkopf (57) ABSTRACT

A DC to DC converter with intermediate conversion into AC power, including: a transformer having a primary winding and a secondary winding; a first DC to AC conversion circuit having its AC terminals coupled with the primary winding of the transformer; a first AC to DC conversion circuit having its AC terminals coupled across a first tap and a second tap of the secondary winding of the transformer; a second AC to DC conversion circuit having its AC terminals coupled across a third tap and a fourth tap of the secondary winding of the transformer, wherein the first tap and the second tap are arranged between the third tap and the fourth tap along the secondary winding of the transformer; and at least one first power switch, being arranged between one of DC terminals of the first AC to DC conversion circuit and one of DC terminals of the second AC to DC conversion circuit. By having the solution as above, the DC output voltage may be changed between two levels by operating only one power switch. Because a power switch is more expensive than a multiple of power diodes, by reducing the number of power switches responsible for changing the level of DC output voltage, it is helpful for decreasing the cost and complexity of control. Besides, the power loss can be decreased due to switching of less power switch.

20 Claims, 10 Drawing Sheets

(56) References Cited

U.S. PATENT DOCUMENTS

| | | |
|---|---|---|
| 2010/0052423 A1* | 3/2010 | Shimada .......... H02M 3/33584 307/43 |
| 2010/0073964 A1 | 3/2010 | Tatsukawa et al. |
| 2012/0112547 A1* | 5/2012 | Ghosh .................... H02J 9/062 307/66 |
| 2012/0274291 A1* | 11/2012 | Ge ........................ H05B 45/37 323/267 |
| 2014/0153290 A1* | 6/2014 | Li ....................... H02M 3/3376 363/17 |
| 2015/0295504 A1* | 10/2015 | Tanahashi ........ H02M 3/33584 307/24 |
| 2017/0187296 A1* | 6/2017 | Zheng ............... H02M 3/33584 |
| 2018/0278153 A1* | 9/2018 | Zhen ....................... H02M 1/34 |

OTHER PUBLICATIONS

Canales, et al., "A High-Power-Density DC/DC Converter for High-Power Distributed Power Systems," IEEE 34th Annual Conference on Power Electronics Specialist, 2003, vol. 1, pp. 11-18.

* cited by examiner

DC TO DC CONVERTER

TECHNICAL FIELD

The invention relates to DC to DC converter, and more particularly to DC to DC conversion with intermediate conversion into AC power.

BACKGROUND ART

DC to DC power converters are required for many modern day applications. For example, such converters are required for high voltage, high power applications such as used in telecommunications, battery chargers, and uninterruptible power supplies with power factor correction.

As switching frequencies increase, the switching losses associated with the turn-on and turn-off of the devices also increase. In soft-switching DC to DC power converters, such as LLC resonant converter, the switching losses can be lower, allowing the resonant converter to operate at higher frequencies. Therefore, the use of resonant converters remains an interesting option for some applications requiring the previous specifications.

The output voltage of the LLC resonant converter is adjusted by changing the switching frequency. However, when the output voltage is far away from rated output voltage, for which the resonant tank's parameter is optimally designed, the performance will decrease. Therefore in practical, additional buck/boost is recommended to be used along with LLC resonant converter, which on the country results in, decreased power density and increased cost. To satisfy the requirement of output current ripple or reduced the output inductance, interleaved buck/boost is usually applied. However, this leads to a more complex control and drive system.

In order to overcome the problem, a conventional solution is to use multi-winding high frequency transformer to create multiple output voltage level while the LLC resonant converter can be designed in a small switching frequency range. An example is presented Francisco Canales et al., A High-Power-Density DC to DC Converter for High-Power Distributed Power Systems, Power Electronics Specialist Conference, 2003. PESC '03. 2003 IEEE 34th Annual. FIG. 4 of the paper shows a topology of rectifier used in a power DC to DC converter. Depending on the state of the power switches ($S_5$, $S_6$), three of the four taps of the secondary winding of the transformer are conducting for output AC power which in turn is converted into DC power at the output of the converter. One of the drawbacks that these prior art converters present is that it allows two-level DC voltage output at most. In order to raise the number of DC output voltage level, additional bidirectional blocking power switches have to be included. This in turn increases power loss, cost and complexity.

BRIEF SUMMARY OF THE INVENTION

According to one aspect of present invention, it provides a DC to DC converter with intermediate conversion into AC power, including: a transformer having a primary winding and a secondary winding; a first DC to AC conversion circuit having its AC terminals coupled with the primary winding of the transformer; a first AC to DC conversion circuit having its AC terminals coupled across a first tap and a second tap of the secondary winding of the transformer; a second AC to DC conversion circuit having its AC terminals coupled across a third tap and a fourth tap of the secondary winding of the transformer, wherein the first tap and the second tap are arranged between the third tap and the fourth tap along the secondary winding of the transformer; and at least one first power switch, being arranged between one of DC terminals of the first AC to DC conversion circuit and one of DC terminals of the second AC to DC conversion circuit.

By having the solution as above, the DC output voltage may be changed between two levels by operating only one power switch, the first power switch or the first power switch. Because a power switch is more expensive than a multiple of power diodes, by reducing the number of power switches responsible for changing the level of DC output voltage, it is helpful for decreasing the cost and complexity of control. Besides, the power loss can be decreased due to switching of less power switch.

Preferably, the at least one first power switch includes a power switch being arranged between the lower DC terminal of the first AC to DC conversion circuit and the lower DC terminal of the second AC to DC conversion circuit, allowing current flowing into the second AC to DC conversion circuit in on-state. And, the at least one first power switch includes another power switch being arranged between the upper DC terminal of the first AC to DC conversion circuit and the upper DC terminal of the second AC to DC conversion circuit, allowing current flowing from the second AC to DC conversion circuit in on-state. This makes it possible to output a three-level DC voltage by using two first power switches.

Preferably, turns ratio between the winding across the third tap and the first tap of the secondary winding and that across the second tap and the fourth tap substantially equals to one. So as to provide the two-level DC output voltage or the three-level DC output voltage with equal voltage intervals.

BRIEF DESCRIPTION OF THE DRAWINGS

The subject matter of the invention will be explained in more detail in the following text with reference to preferred exemplary embodiments which are illustrated in the drawings, in which.

The reference symbols used in the drawings, and their meanings, are listed in summary form in the list of reference symbols. In principle, identical parts are provided with the same reference symbols in the figures.

PREFERRED EMBODIMENTS OF THE INVENTION

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. Note, the headings are for organizational purposes only and are not meant to be used to limit or interpret the description or claims.

Furthermore, note that the word "may" is used throughout this application in a permissive sense (i.e., having the potential to, being able to), not a mandatory sense (i.e., must)." The term "include", and derivations thereof, mean "including, but not limited to". The term "coupled" means "directly or indirectly coupled", and the term "coupled" means "directly or indirectly coupled".

Figure 1:
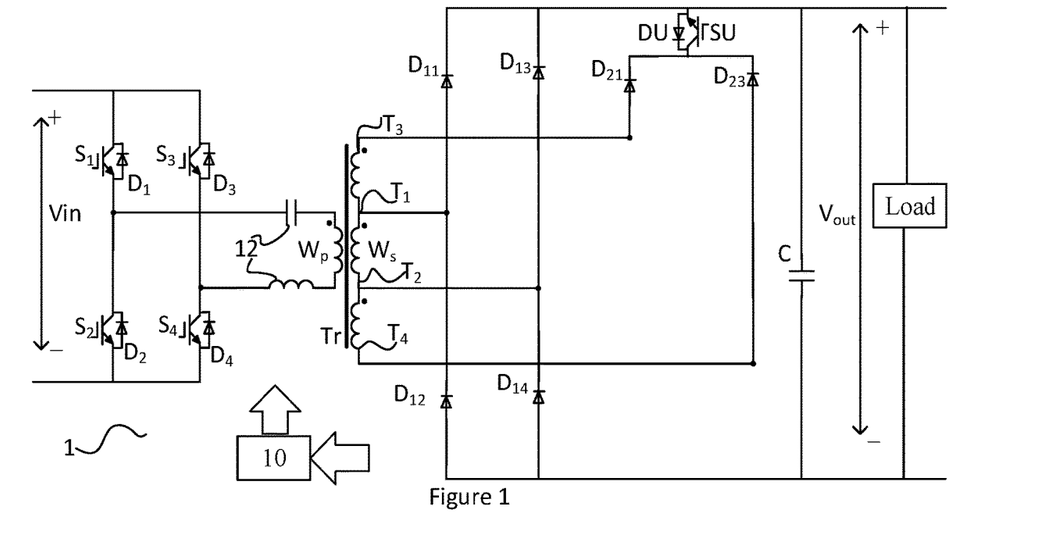
FIG. 1 shows a DC to DC converter with intermediate conversion into AC power according to an embodiment of present invention.

FIG. 1 shows a DC to DC converter with intermediate conversion into AC power according to an embodiment of present invention. Referring to FIG. 1, a DC to DC converter 1 in accordance with one non-limiting example embodiment of the disclosed concept is shown. An input voltage Vin is received on a primary side of the DC to DC converter 1. The primary side of the DC to DC converter 1 includes a first DC to AC conversion circuit S1, S2, S3, S4 which receives the input voltage Vin. For example, the first DC to AC conversion circuit S1, S2, S3, S4 may include four power switches S1, S2, S3, S4 in a topology of full-bridge, which are controlled by a control unit 10. As alternative, the first DC to AC conversion circuit may use various topologies, such as of push-pull. The first DC to AC conversion circuit may be equipped with a resonant tank 20 electrically connected to the primary winding Wp of the transformer Tr and drive the resonant tank to achieve soft-switching of the power devices.

Transformer Tr has primary and secondary windings Wp, Ws. The primary winding Wp of the transformer Tr is electrically coupled across AC terminals of the first DC to AC conversion circuit S1, S2, S3, S4, wherein the resonant tank may be inserted therebetween. The transformer Tr has a magnetic inductance component. The magnetic inductance component may be caused by, for example and without limitation, a ferromagnetic core (not shown) of the transformer Tr. The transformer Tr isolates the primary and secondary sides of the DC to DC converter 1 from each other.

The secondary winding Ws of the transformer Tr includes four taps T1, T2, T3, T4. The first tap T1 and the second tap T2 are arranged between the third tap T3 and the fourth tap T4 along the secondary winding Ws of the transformer Tr. The first tap T1 and the second tap T2 are electrically coupled across AC terminals of a first AC to DC conversion circuit D11, D12, D13, D14. The third tap T3 and the fourth tap T4 are electrically coupled across AC terminals of a second AC to DC conversion circuit D21, D22, D23, D24. The output voltage Vout of the DC to DC converter 1 is provided across the DC terminals of the first AC to DC conversion circuit D11, D12, D13, D14. Additionally, a first power switch SU is arranged between one of DC terminals of the first AC to DC conversion circuit D11, D12, D13, D14 and one of DC terminals of the second AC to DC conversion circuit D21, D22, D23, D24, allowing current flowing from the second AC to DC conversion circuit D21, D22, D23, D24 in on-state. For example, the first power switch SU is made of Silicon carbide or Silicon.

A capacitive element C may be coupled across the DC terminals of the first AC to DC conversion circuit for providing output DC voltage.

The first AC to DC conversion circuit may include a plurality of first power diodes D11, D12, D13, D14 electrically coupled in a full-bridge topology. The connection point of the power diodes D11, D12 and that of the power diodes D13, D14 are electrically coupled across the first tap T1 and the second tap T2.

The second AC to DC conversion circuit may include a plurality of second power diodes D21, D23 electrically coupled in a full-wave bridge rectifier topology. AC terminals of the second AC to DC conversion circuit are electrically coupled across the third tap T3 and the fourth tap T4.

The upper power diodes D11, D13 of the first AC to DC conversion circuit are electrically coupled with the power diodes D21, D23 of the second AC to DC conversion circuit via the first power switch SU allowing current flowing from the second AC to DC conversion circuit in on-stat. The output voltage Vout of the DC to DC converter 1 is provided across the positive terminal and the negative terminal of the first AC to DC conversion circuit.

The control unit 10 senses the output voltage Vout of the DC to DC converter 1 and controls the switching of the power switches S1, S2, S3, S4 in the first DC to AC conversion circuit S1, S2, S3, S4. Changing the frequency at which the power switches S1, S2, S3, S4 are switched adjusts the output voltage Vout for a LLC resonant converter. However, adjusting the frequency at which the power switches S1, S2, S3, S4 are switched also affects the efficiency of the DC to DC converter 1. As such, it is desirable to switch the power switches S1, S2, S3, S4 at an optimally efficient frequency as much as possible.

The control unit 10 can also control a transition of the first power switch SU. Generally, the control unit 10 controls the frequency at which the power switches S1, S2, S3, S4 are switched based on feedback from the output voltage Vout.

Figure 2:
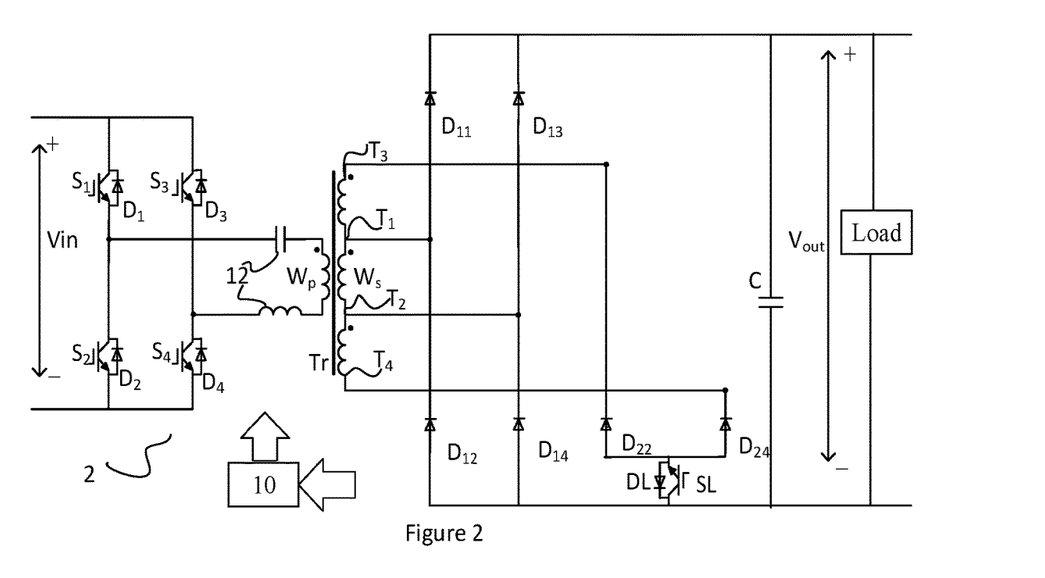
FIG. 2 shows a DC to DC converter with intermediate conversion into AC power according to anther embodiment of present invention.

FIG. 2 shows a DC to DC converter with intermediate conversion into AC power according to another embodiment of present invention. The secondary side of the DC/DC converter 2 is substantially similar to the secondary side of the DC/DC converter 1 shown in FIG. 1. However, the second AC to DC conversion circuit may instead include a plurality of second power diodes D22, D24 electrically coupled in a full-wave bridge rectifier topology. Rather than including the first power switch SU, the secondary side of the DC/DC converter 2 includes a first power switch SL electrically coupled between the lower power diodes D12, D14 of the first AC to DC conversion circuit and the power diodes D22, D24 of the second AC to DC conversion circuit, allowing current flowing into the second AC to DC conversion circuit in on-state. A fourth power diode DL may be provided being anti-parallel coupled with the first power switches SL.

Figure 3:
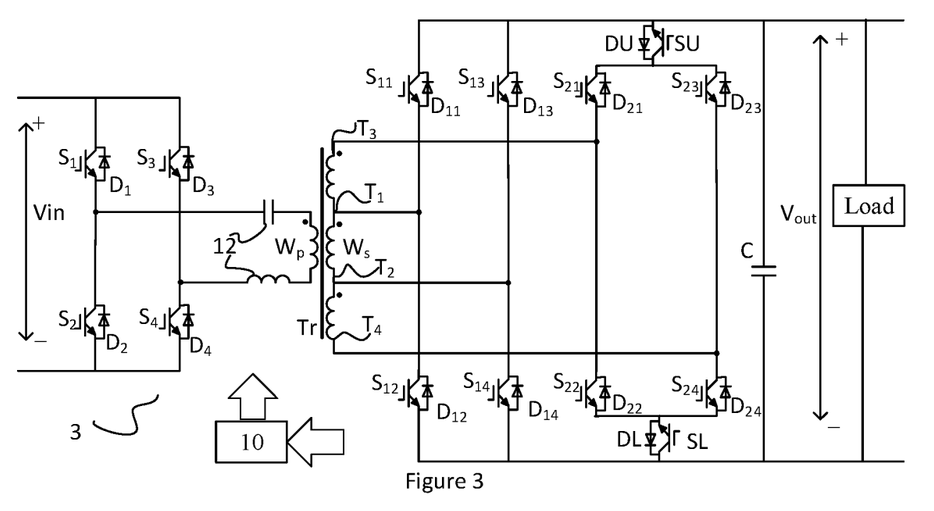
FIG. 3 shows a DC to DC converter with intermediate conversion into AC power according to another embodiment of present invention.

FIG. 3 shows a DC to DC converter with intermediate conversion into AC power according to another embodiment of present invention. The secondary side of the DC/DC converter 3 is substantially similar to the secondary side of the DC/DC converter 1 shown in FIG. 1. However, it further includes another first power switch SL electrically coupled between the lower power diodes D12, D14 of the first AC to DC conversion circuit and the lower power diodes D22, D24 of the second AC to DC conversion circuit. Two fourth power diodes DU, DL may be provided each being anti-parallel coupled with the respective one of the at least one first power switches SU, SL.

For example, the first power switch SL is made of Silicon carbide or Silicon; the third power switch S11, S12, S13, S14 is made of Silicon carbide or Silicon; the fourth power switch S21, S22, S23, S24 is made of Silicon carbide or Silicon; the third power diode D1, D2, D3, D4 is made of Silicon carbide or Silicon; and the fourth power diode DU, DL is made of Silicon carbide or Silicon.

In all of the DC to DC converters 1, 2, 3 shown in FIGS. 1, 2 and 3, a level of the output voltage Vout can be changed by operating the first power switch SU, SL. When the first power switch SU, SL is in off-state in DC to DC converter 1, 2 and both of them are in off-state in DC to DC converter 3, the DC power is output as the current flows through the first tap T1 and the second tap T2, thus the DC output voltage is regulated at the first-level.

When the first power switch SU is in on-state in the DC to DC converter 1, the DC power is output as the current flows alternating between the path involving the third tap T3 and the second tap T2 and that involving the first tap T1 and the fourth tap T4. When the first power switch SL is in on-state in the DC to DC converter 2, the DC power is output as the current flows alternating between the path involving the third tap T3 and the second tap T2 and that involving the first tap T1 and the fourth tap T4, as well. When either of the first power switches SU, SL is in on-state in the DC to DC converter 3, the current flow is substantially similar to either of the scenarios as above. Thus the DC output voltage is regulated at the second-level above the first-level.

Therefore, the DC output voltage Vout may be changed between two levels by operating only one power switch, the first power switch SU or the first power switch SL. Because a power switch is more expensive than a multiple of power diodes, by reducing the number of power switches responsible for changing the level of DC output voltage, it is helpful for decreasing the cost and complexity of control. Besides, the power loss can be decreased due to switching of less power switch.

When both of the first power switches SU, SL are in on-state in the DC to DC converter 3, the DC power is output as the current flows through the third tap T3 and the fourth tap T4, thus the DC output voltage is regulated at the third-level above the second-level. In order to provide the three-level DC output voltage with equal interval, turns ratio between the winding across the third tap T3 and the first tap T1 of the secondary winding and that across the second tap T2 and the fourth tap T4 substantially equals to one.

In order to achieve a bi-directional conversion, a plurality of third power switches S11, S12, S13, S14 may be provided each being anti-parallel coupled with the respective one of the first power diodes D11, D12, D13, D14 of the first AC to DC conversion circuit; plurality of fourth power switches S21, S22, S23, S24 may be provided each being anti-parallel coupled with the respective one of the second power diodes D21, D22, D23, D24 of the second AC to DC conversion circuit; a third AC to DC conversion circuit may be provided having a plurality of third power diodes D1, D2, D3, D4 and having its AC terminals coupled with the primary winding Wp of the transformer; and a fourth power diode DU may be provided being anti-parallel coupled with the first power switches SU. Preferably, The first power diode D11, D12, D13, D14 may be made of Silicon carbide or Silicon, and the second power diode D21, D22, D23, D24 may be made of Silicon carbide or Silicon, as well.

FIGS. 4A, 4B, 4C and 4D show current paths in the secondary side of the DC to DC converter according to FIG. 1.

Figure 4A:
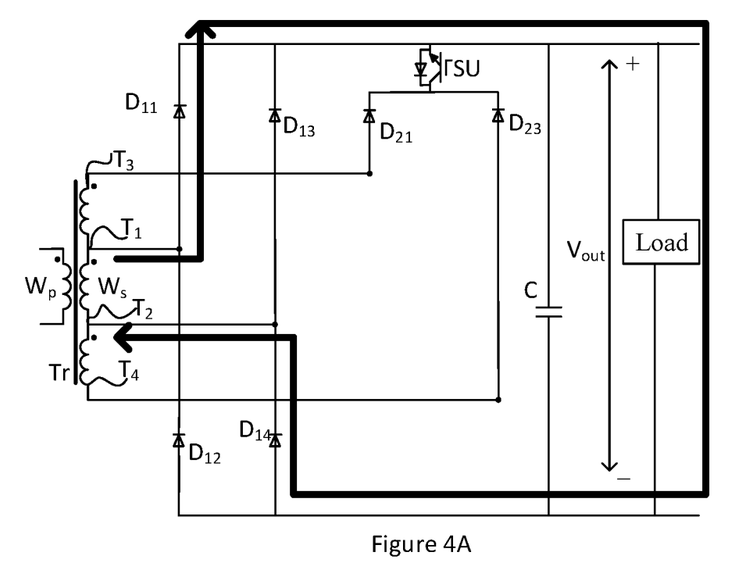
FIGS. 4A, 4B, 4C and 4D show current paths in the secondary side of the DC to DC converter according to FIG. 1.

Referring to FIG. 4A, the first power switch SU is open and the current in the secondary winding Ws of the transformer Tr flows in a direction from the first tap T1 to the first AC to DC conversion circuit. The current flows through the power diodes D11 of the first AC to DC conversion circuit and through the filtering capacitor C as well as out of the positive output terminal of the DC to DC converter 1 to any load electrically connected thereto. The current then flows back into the first AC to DC conversion circuit through the negative output terminal, through the power diode D14 of the first AC to DC conversion circuit, and to the second tap T2. Current does not flow through the third tap T3 and the fourth tap T4 when the first power switch SU is open.

Figure 4B:
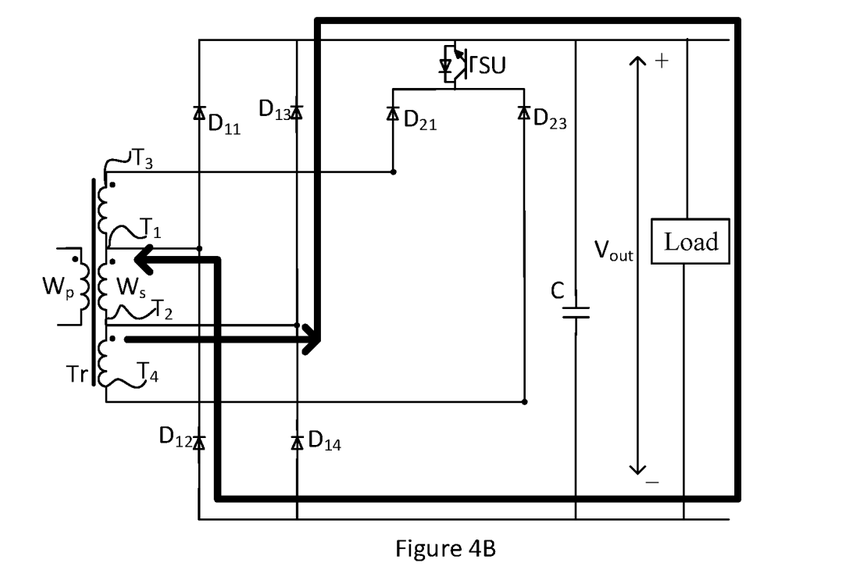

Referring to FIG. 4B, the current path in the secondary side of the transformer Tr is shown when the direction of the current is reversed. Similar to FIG. 4A, the first power switch SU is open. However, the current in the secondary winding Ws of the transformer Tr flows in a direction from the second tap T2 to the first AC to DC conversion circuit. The current flows through the power diodes D13 of the first AC to DC conversion circuit and through the filtering capacitor C as well as out of the positive output terminal of the DC to DC converter 1 to any load electrically connected thereto. The current then flows back into the first AC to DC conversion circuit through the negative output terminal, through the power diode D12 of the first AC to DC conversion circuit, and to the first tap T1. Current does not flow through the third tap T3 and the fourth tap T4 when the first power switch SU is open.

Figure 4C:
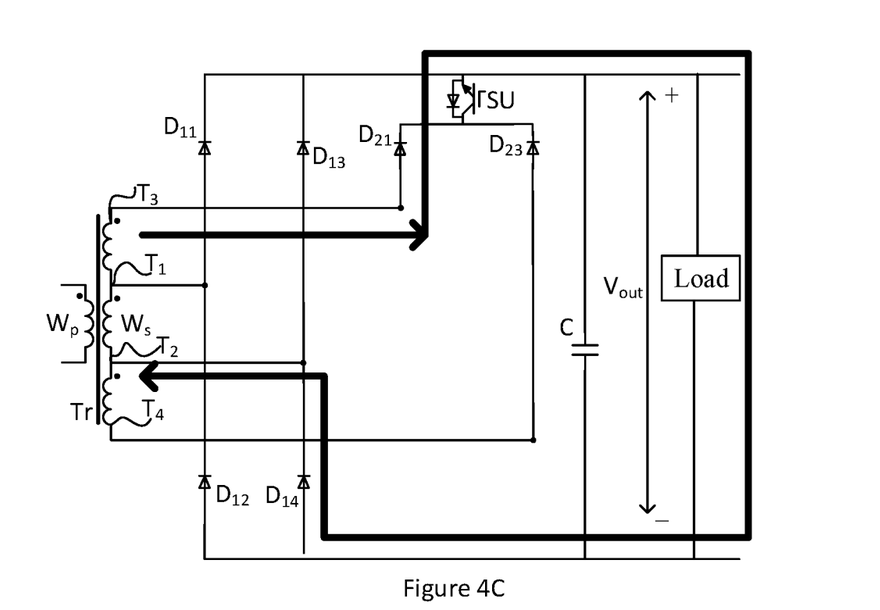

In FIG. 4C, a current path is when the first power switch SU is closed is shown. The current in the secondary winding Ws of the transformer Tr flows from the third tap T3 to the second AC to DC conversion circuit. The current then flows through the power diode D21 of the second AC to DC conversion circuit and the closed first power switch SU and through the filtering capacitor as well as out the positive output terminal of the DC/DC converter 1 to the load electrically connected thereto. The current then flows back into the DC/DC converter 1 through the negative output terminal, through the power diode D14 of the first AC to DC conversion circuit, and to the second tap T2.

Figure 4D:
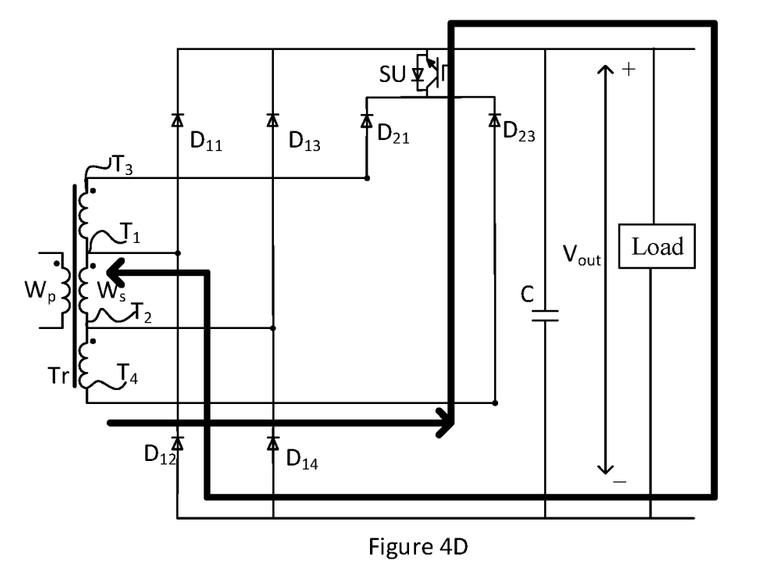

Referring to FIG. 4D, the current path in the secondary side of the transformer Tr is shown when the direction of the current is reversed. Similar to FIG. 4C, the first power switch SU is closed. However, the current in the secondary winding Ws of the transformer Tr flows in a direction from the fourth tap T4 to the second AC to DC conversion circuit. The current flows through the power diodes D23 of the second AC to DC conversion circuit and the closed first power switch SU and through the filtering capacitor C as well as out of the positive output terminal of the DC to DC converter 1 to any load electrically connected thereto. The current then flows back into the first AC to DC conversion circuit through the negative output terminal, through the power diode D12 of the first AC to DC conversion circuit, and to the first tap T1.

FIGS. 5A, 5B, 5C and 5D show current paths in the secondary side of the DC to DC converter according to FIG. 2.

Figure 5A:
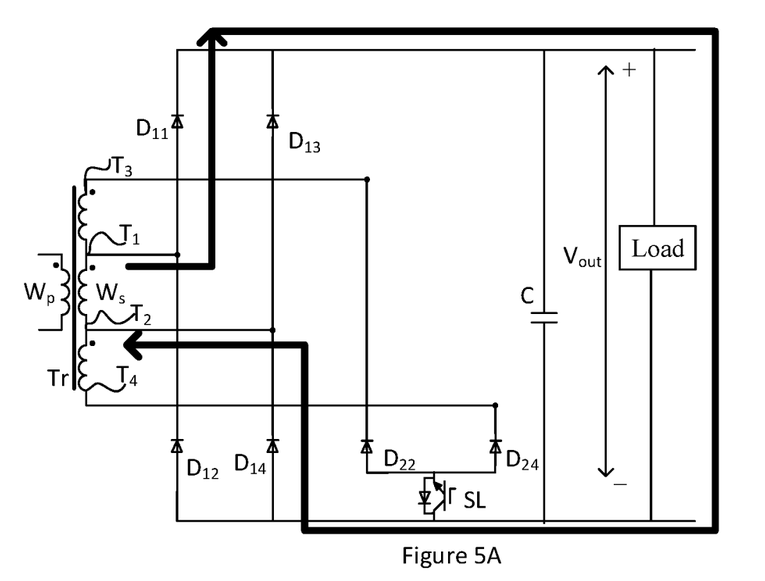
FIGS. 5A, 5B, 5C and 5D show current paths in the secondary side of the DC to DC converter according to FIG. 2.
Figure 5B:
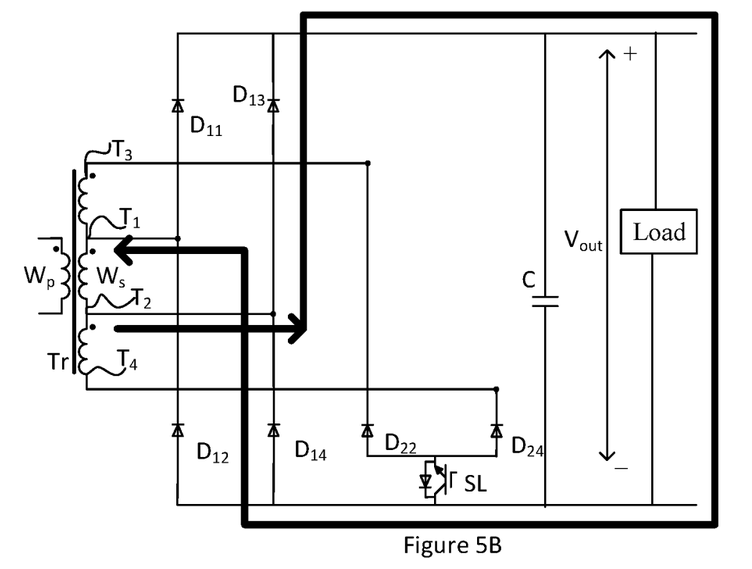

Referring to FIGS. 5A and 5B, the current paths are similar to FIGS. 4A and 4B when the first power switch SL is open.

Figure 5C:
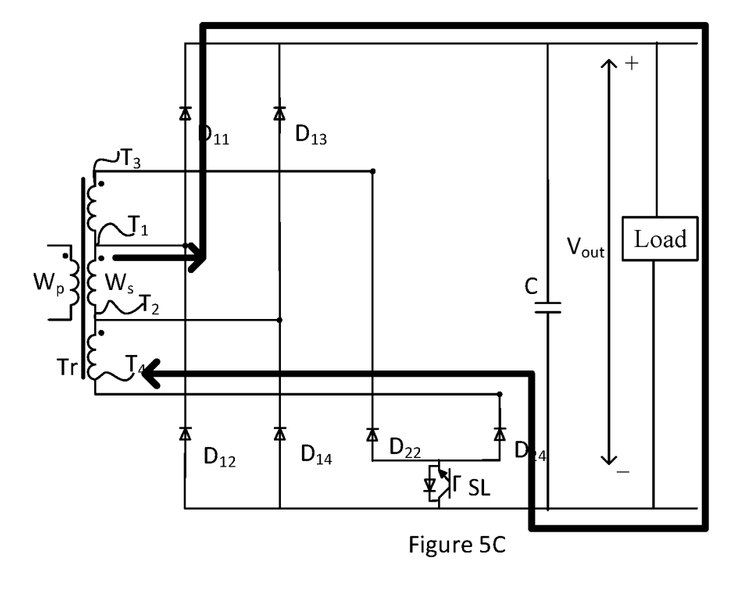

In FIG. 5C, a current path is when the first power switch SL is closed is shown. The current in the secondary winding Ws of the transformer Tr flows in a direction from the first tap T1 to the first AC to DC conversion circuit. The current flows through the power diodes D11 of the first AC to DC conversion circuit through the filtering capacitor C as well as out of the positive output terminal of the DC to DC converter 2 to any load electrically connected thereto. The current then flows back into the second AC to DC conversion circuit through the negative output terminal and the closed first power switch SL. The current then flows through the power diode D24 of the second AC to DC conversion circuit, and to the fourth tap T4.

Figure 5D:
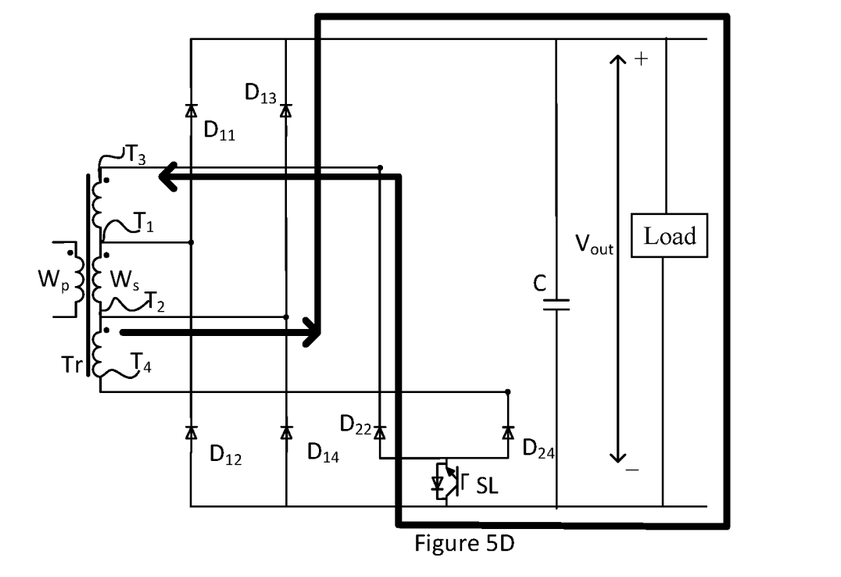

Referring to FIG. 5D, the current path in the secondary side of the transformer Tr is shown when the direction of the current is reversed. Similar to FIG. 5C, the first power switch SL is closed. However, current flows in a direction from the second tap T2 to the first AC to DC conversion circuit. The current flows through the power diodes D13 of the first AC to DC conversion circuit through the filtering capacitor C as well as out of the positive output terminal of the DC to DC converter 2 to any load electrically connected thereto. The current then flows back into the second AC to DC conversion circuit through the negative output terminal and the closed first power switch SL. The current then flows through the power diode D22 of the second AC to DC conversion circuit, and to the third tap T3.

FIGS. 6A, 6B, 6C, 6D, 6E, 6F, 6G and 6H show current paths in the secondary side of the DC to DC converter according to FIG. 3.

Figure 6A:
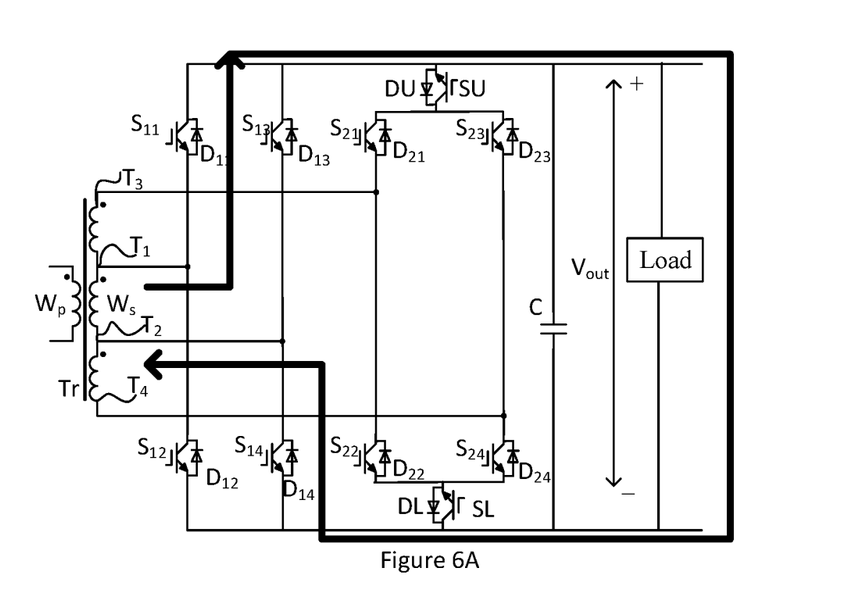
FIGS. 6A, 6B, 6C, 6D, 6E, 6F, 6G and 6H show current paths in the secondary side of the DC to DC converter according to FIG. 3.
Figure 6B:
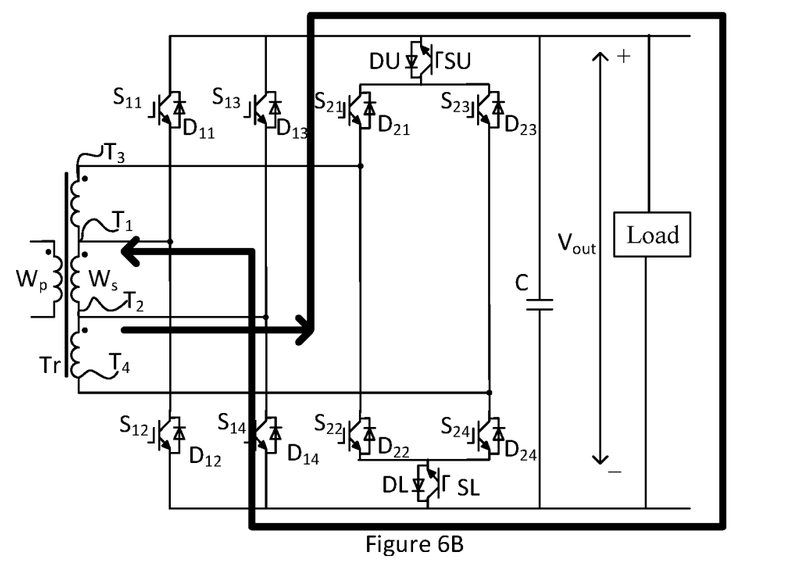

Referring to FIGS. 6A and 6B, the current paths are similar to FIGS. 4A and 4B when both of the first power switches SU, SL are open.

Figure 6C:
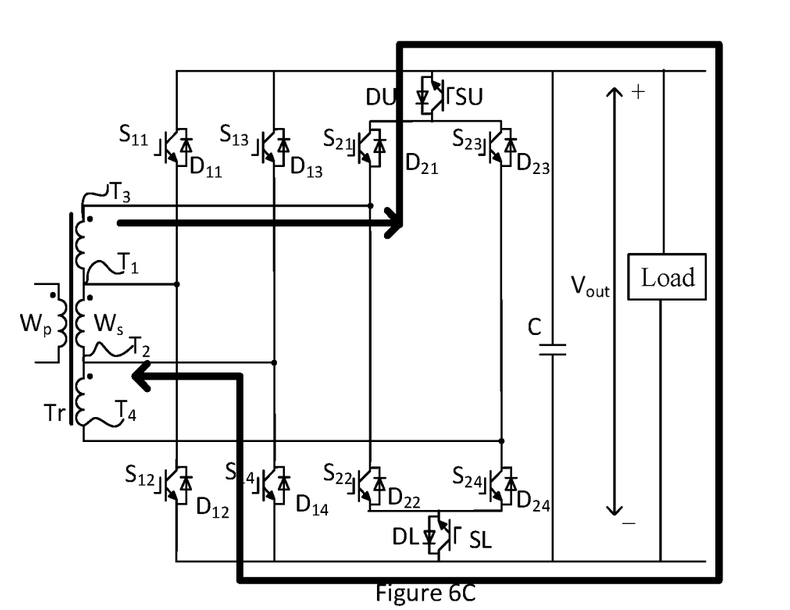
Figure 6D:
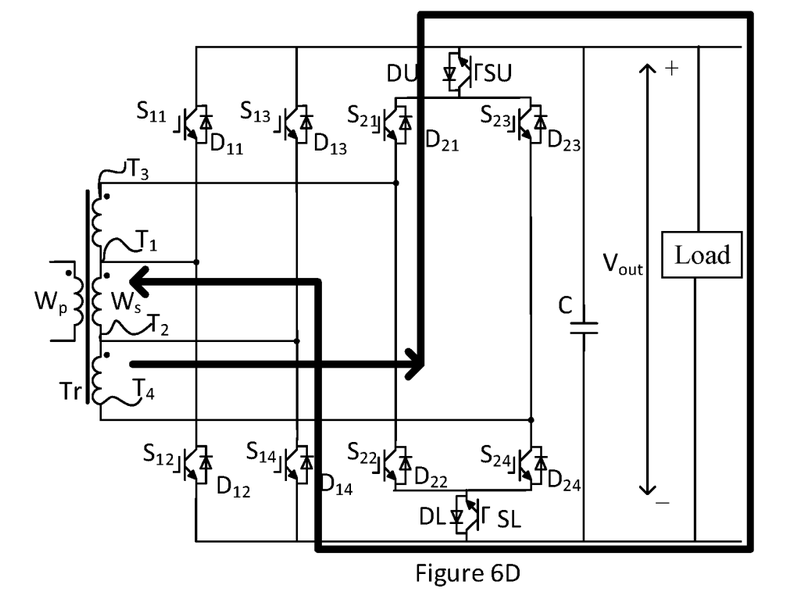

Referring to FIGS. 6C and 6D, the current paths are similar to FIGS. 4C and 4D when first power switch SU is closed and another first power switch SL is open.

Figure 6E:
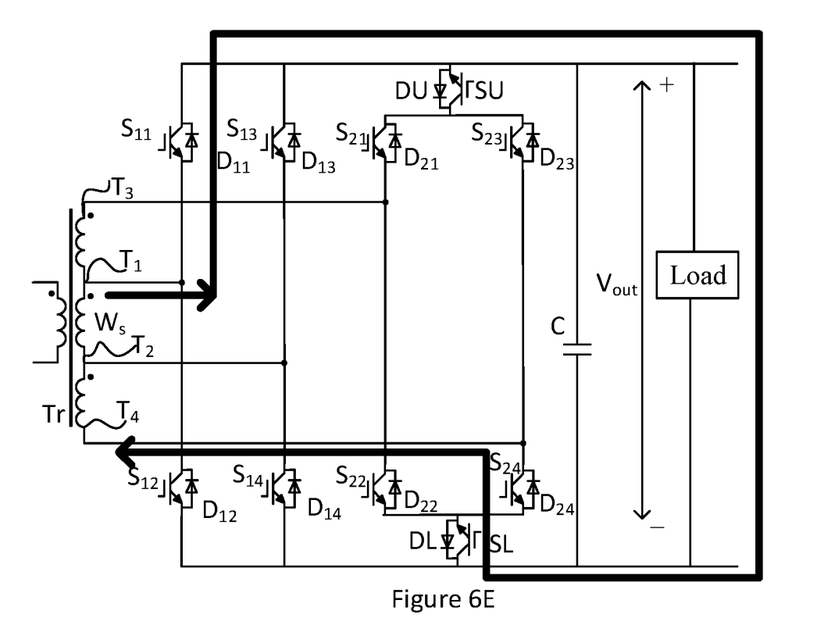
Figure 6F:
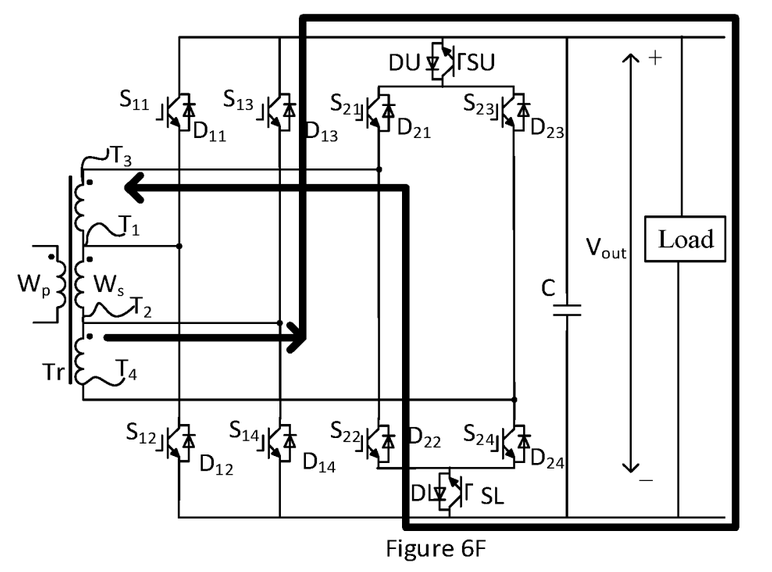

Referring to FIGS. 6E and 6F, the current paths are similar to FIGS. 5C and 5D when first power switch SL is closed and another first power switch SU is open.

Figure 6G:
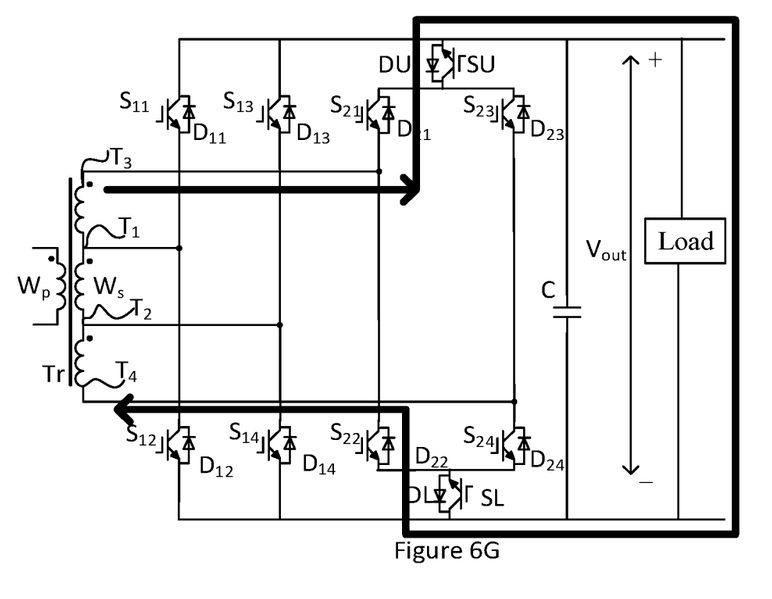

In FIG. 6G, a current path is when both of the first power switches SU, SL are closed is shown. The current in the secondary winding Ws of the transformer Tr flows from the third tap T3 to the second AC to DC conversion circuit. The current then flows through the power diode D21 of the second AC to DC conversion circuit and the closed first power switch SU and through the filtering capacitor as well as out the positive output terminal of the DC/DC converter 3 to the load electrically connected thereto. The current then flows back into the DC/DC converter 3 through the negative output terminal, through the closed first power switch SL, to the second AC to DC conversion circuit. The current then flows through the power diode D24 of the second AC to DC conversion circuit, and to the fourth tap T4. The current does not flow through the first tap T1 and the second tap T2 when both of the first power switches SU, SL are closed.

Figure 6H:
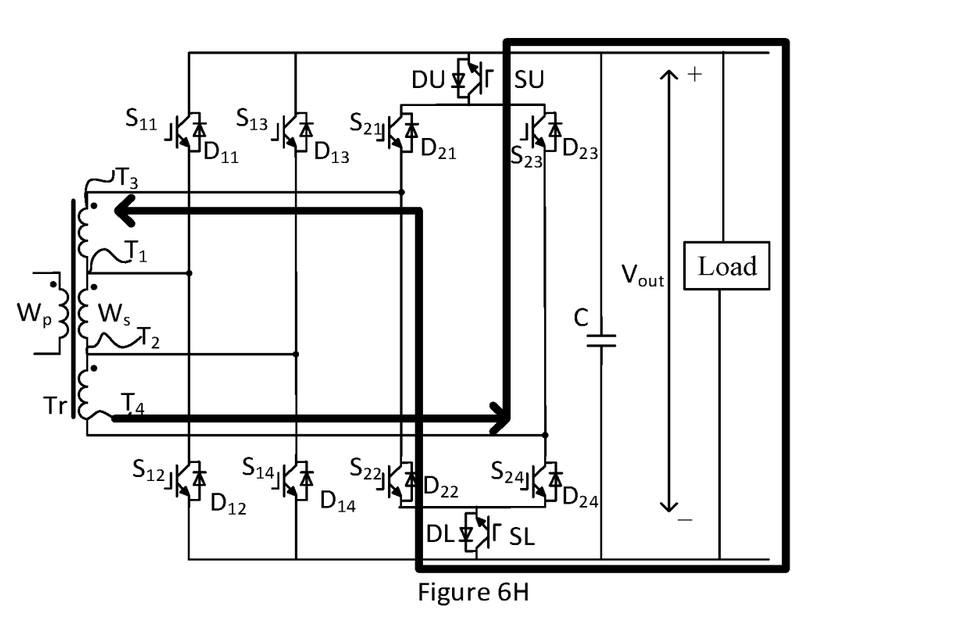

Referring to FIG. 6H, the current path in the secondary side of the transformer Tr is shown when the direction of the current is reversed. Similar to FIG. 6G, both of the first power switches SU, SL are closed. However, the current in the secondary winding Ws of the transformer Tr flows from the fourth tap T4 to the second AC to DC conversion circuit. The current then flows through the power diode D23 of the second AC to DC conversion circuit and the closed first power switch SU and through the filtering capacitor as well as out the positive output terminal of the DC/DC converter 3 to the load electrically connected thereto. The current then flows back into the DC/DC converter 3 through the negative output terminal, through the closed first power switch SL, to the second AC to DC conversion circuit. The current then flows through the power diode D22 of the second AC to DC conversion circuit, and to the third tap T3. The current does not flow through the first tap T1 and the second tap T2 when both of the first power switches SU, SL are closed.

Though the present invention has been described on the basis of some preferred embodiments, those skilled in the art should appreciate that those embodiments should by no way limit the scope of the present invention. Without departing from the spirit and concept of the present invention, any variations and modifications to the embodiments should be within the apprehension of those with ordinary knowledge and skills in the art, and therefore fall in the scope of the present invention which is defined by the accompanied claims.

The invention claimed is:

1. A DC to DC converter with intermediate conversion into AC power, including:
   a transformer having a primary winding and a secondary winding;
   a first DC to AC conversion circuit having its AC terminals coupled with the primary winding of the transformer;
   a first AC to DC conversion circuit having its AC terminals coupled across a first tap and a second tap of the secondary winding of the transformer;
   a second AC to DC conversion circuit having its AC terminals coupled across a third tap and a fourth tap of the secondary winding of the transformer, wherein the first tap and the second tap are arranged between the third tap and the fourth tap along the secondary winding of the transformer; and
   at least one first power switch, being arranged between one of DC terminals of the first AC to DC conversion circuit and one of DC terminals of the second AC to DC conversion circuit;
   wherein the at least one first power switch includes a power switch being arranged between a lower DC terminal of the first AC to DC conversion circuit and a lower DC terminal of the second AC to DC conversion circuit, allowing current flowing into the second AC to DC conversion circuit in on-state.

2. The DC to DC converter according to claim 1, wherein:
   the at least one first power switch further includes another power switch being arranged between an upper DC terminal of the first AC to DC conversion circuit and an upper DC terminal of the second AC to DC conversion circuit, allowing current flowing from the second AC to DC conversion circuit in on-state.

3. The DC to DC converter according to claim 2, wherein:
   the first DC to AC conversion circuit includes a plurality of second power switches;
   the first AC to DC conversion circuit includes a plurality of first power diodes; the second AC to DC conversion circuit includes a plurality of second power diodes;
   the at least one first power switch is made of Silicon carbide or Silicon;
   the plurality of second power switches are made of Silicon carbide or Silicon;
   the plurality of first power diodes are made of Silicon carbide or Silicon; and
   the plurality of second power diodes are made of Silicon carbide or Silicon.

4. The DC to DC converter according to claim 2, further including a capacitive element, being coupled across the DC terminals of the first AC to DC conversion circuit for providing output DC voltage.

5. The DC to DC converter according to claim 2, wherein:
   the first AC to DC conversion circuit has a topology of full bridge; and the second AC to DC conversion circuit has a topology of full bridge.

6. The DC to DC converter according to claim 5, further includes:
a plurality of third power switches each being anti-parallel coupled with the respective one of first power diodes of the first AC to DC conversion circuit;
a plurality of fourth power switches each being anti-parallel coupled with the respective one of second power diodes of the second AC to DC conversion circuit;
a third AC to DC conversion circuit having a plurality of third power diodes and having its AC terminals coupled with the primary winding of the transformer; and
at least one fourth power diode each being anti-parallel coupled with the respective one of the at least one first power switch.

7. The DC to DC converter according to claim 2, wherein:
the first DC to AC conversion circuit includes a plurality of second power switches;
the first AC to DC conversion circuit includes a plurality of first power diodes;
the second AC to DC conversion circuit includes a plurality of second power diodes;
the at least one first power switch is made of Silicon carbide or Silicon;
the plurality of second power switches are made of Silicon carbide or Silicon;
the plurality of first power diodes are made of Silicon carbide or Silicon; and
the plurality of second power diodes are made of Silicon carbide or Silicon.

8. The DC to DC converter according to claim 1, further including:
a capacitive element, being coupled across the DC terminals of the first AC to DC conversion circuit for providing output DC voltage.

9. The DC to DC converter according to claim 8, wherein turns ratio between the winding across the third tap and the first tap of the secondary winding and the winding across the second tap and the fourth tap substantially equals to one.

10. The DC to DC converter according to claim 1, wherein:
turns ratio between the winding across the third tap and the first tap of the secondary winding and the winding across the second tap and the fourth tap substantially equals to one.

11. The DC to DC converter according to claim 1, wherein:
the first DC to AC conversion circuit includes a plurality of second power switches;
the first AC to DC conversion circuit includes a plurality of first power diodes;
the second AC to DC conversion circuit includes a plurality of second power diodes;
the at least one first power switch is made of Silicon carbide or Silicon;
the plurality of second power switches are made of Silicon carbide or Silicon;
the plurality of first power diodes are made of Silicon carbide or Silicon; and
the plurality of second power diodes are made of Silicon carbide or Silicon.

12. The DC to DC converter according to claim 1, wherein:
the first AC to DC conversion circuit has a topology of full bridge; and
the second AC to DC conversion circuit has a topology of full bridge.

13. The DC to DC converter according to claim 12, further includes:
a plurality of third power switches each being anti-parallel coupled with the respective one of first power diodes of the first AC to DC conversion circuit;
a plurality of fourth power switches each being anti-parallel coupled with the respective one of second power diodes of the second AC to DC conversion circuit;
a third AC to DC conversion circuit having a plurality of third power diodes and having its AC terminals coupled with the primary winding of the transformer; and
at least one fourth power diode each being anti-parallel coupled with the respective one of the at least one first power switch.

14. The DC to DC converter according to claim 9, wherein:
the plurality of third power switches are made of Silicon carbide or Silicon;
the plurality of fourth power switches are made of Silicon carbide or Silicon;
the plurality of third power diodes are made of Silicon carbide or Silicon and
the fourth power diode is made of Silicon carbide or Silicon.

15. A DC to DC converter with intermediate conversion into AC power, including:
a transformer having a primary winding and a secondary winding;
a first DC to AC conversion circuit having its AC terminals coupled with the primary winding of the transformer;
a first AC to DC conversion circuit having its AC terminals coupled across a first tap and a second tap of the secondary winding of the transformer;
a second AC to DC conversion circuit having its AC terminals coupled across a third tap and a fourth tap of the secondary winding of the transformer, wherein the first tap and the second tap are arranged between the third tap and the fourth tap along the secondary winding of the transformer; and
at least one first power switch, being arranged between one of DC terminals of the first AC to DC conversion circuit and one of DC terminals of the second AC to DC conversion circuit;
wherein turns ratio between the winding across the third tap and the first tap of the secondary winding and the winding across the second tap and the fourth tap substantially equals to one.

16. The DC to DC converter according to claim 15, further including:
a capacitive element, being coupled across the DC terminals of the first AC to DC conversion circuit for providing output DC voltage.

17. The DC to DC converter according to claim 15, wherein:
the first DC to AC conversion circuit includes a plurality of second power switches;
the first AC to DC conversion circuit includes a plurality of first power diodes;
the second AC to DC conversion circuit includes a plurality of second power diodes;
the at least one first power switch is made of Silicon carbide or Silicon;

the plurality of second power switches are made of Silicon carbide or Silicon;

the plurality of first power diodes are made of Silicon carbide or Silicon; and the plurality of second power diodes are made of Silicon carbide or Silicon.

18. The DC to DC converter according to claim 15, wherein:

the first AC to DC conversion circuit has a topology of full bridge; and the second AC to DC conversion circuit has a topology of full bridge.

19. The DC to DC converter according to claim 18, further includes:

a plurality of third power switches each being anti-parallel coupled with the respective one of the first power diodes of the first AC to DC conversion circuit;

a plurality of fourth power switches each being anti-parallel coupled with the respective one of the second power diodes of the second AC to DC conversion circuit;

a third AC to DC conversion circuit having a plurality of third power diodes and having its AC terminals coupled with the primary winding of the transformer; and at least one fourth power diode each being anti-parallel coupled with the respective one of the at least one first power switch.

20. The DC to DC converter according to claim 19, wherein:

the plurality of third power switches are made of Silicon carbide or Silicon;

the plurality of fourth power switches are made of Silicon carbide or Silicon;

the plurality of third power diodes are made of Silicon carbide or Silicon and the fourth power diode is made of Silicon carbide or Silicon.

\* \* \* \* \*